United States Patent [19]

Antopolsky et al.

[11] Patent Number: 5,087,092
[45] Date of Patent: Feb. 11, 1992

[54] COVER FOR MOTOR VEHICLES

[76] Inventors: Eliahu Antopolsky, 4 Harav Kook St., 49315 Petach Tikva; Efraim Ramon, Talei Menashe 553, 70392 Beer Yaacov, both of Israel

[21] Appl. No.: 577,665

[22] Filed: Sep. 5, 1990

[30] Foreign Application Priority Data

Sep. 8, 1989 [IL] Israel .......................................... 91566

[51] Int. Cl.$^5$ ........................................ B60J 1/20
[52] U.S. Cl. ........................... 296/95.1; 296/97.8; 160/370.2
[58] Field of Search ............. 296/95.1, 136, 97.8, 296/99.1; 160/370.2, 84.1; 150/166

[56] References Cited

U.S. PATENT DOCUMENTS

| 3,146,784 | 9/1964 | Silver | 296/136 X |
|---|---|---|---|
| 4,519,644 | 5/1985 | Song | 296/136 |
| 4,671,334 | 6/1987 | Yadegar et al. | 296/97.8 X |
| 4,848,825 | 7/1989 | Nieinberger | 160/370.2 X |
| 4,848,827 | 7/1989 | Ou | 296/99.1 |
| 4,889,171 | 12/1989 | Minimo | 150/166 |
| 4,951,993 | 8/1990 | Taboada | 160/370.2 X |

FOREIGN PATENT DOCUMENTS 60-422 3/1989 Japan ...................................... 296/136

Primary Examiner—Johnny D. Cherry
Assistant Examiner—Joseph D. Pape
Attorney, Agent, or Firm—Benjamin J. Barish

[57] ABSTRACT

A cover for a motor vehicle includes a panel of still sheet material having a length and width sufficient at least to cover the vehicle roof and formed with a plurality of longitudinal fold lines to permit folding it in accordian fashion and thereby to adjust its width to the width of the vehicle roof to which it is applied, and a plurality of anchoring members extending from opposite sides of the panel for anchoring it to the vehicle roof when applied thereover.

7 Claims, 1 Drawing Sheet

COVER FOR MOTOR VEHICLES

FIELD AND BACKGROUND OF THE INVENTION

The present invention relates to a cover for motor vehicles, and particularly to a cover which is applied externally of the motor vehicle to shield it from the elements, especially the sun.

A number of covers for motor vehicles have been developed and are described in the patent literature. However, the known covers are relatively expensive to produce and/or are relatively inconvenient to apply and remove, and therefore such covers have not come into widespread use.

OBJECTS AND BRIEF SUMMARY OF THE INVENTION

An object of the present invention is to provide a cover for a motor vehicle which can be produced in volume and at low cost, and which can also be applied and removed in a very convenient manner.

According to the present invention, there is provided a cover for a motor vehicle, comprising a panel of stiff sheet material having a length and width sufficient at least to cover the vehicle roof and formed with a plurality of longitudinal fold lines to permit folding it in accordian fashion and thereby to adjust its width to the width of the vehicle roof to which it is applied; and a plurality of anchoring members extending from opposite sides of the panel for anchoring it to the vehicle roof when applied thereover.

According to still further features in the preferred embodiment of the invention described below, the anchoring members are flexible elongated elements projecting from the opposite sides of the panel and receivable between the vehicle body and the vehicle doors or windows for anchoring the panel to the vehicle roof when such doors or windows are closed.

According to still further features in the described preferred embodiment, the panel is of a length greater than that of the vehicle roof so as to extend forwardly of the vehicle windshield and thereby to at least partially shield it from the sun when the panel is applied to the vehicle roof. More particularly, the panel length is sufficiently greater than that of the vehicle roof so as to extend rearwardly of the vehicle rear window and thereby also to at least partially shield it from the sun when the panel is applied to the vehicle roof.

According to a further feature in the described preferred embodiment, the panel is also formed with at least one transverse fold line to permit it to be folded both along its width and along its length into a compact unit for storage or handling when not in use.

A preferred construction is described wherein the panel includes three sections each constituted of a sheet of stiff material formed with the longitudinal fold lines and joined together by two transversely extending flexible strips defining two transverse fold lines. In the described embodiment, the anchoring members are constituted of extensions of the transversely extending flexible strip or strips.

As will be apparent from the description below, a cover constructed in accordance with the foregoing features may be manufactured in volume and at low cost, e.g. from cardboard or plastic sheet material, with the panel sections being secured together by thin plastic or paper sheets or film. Such a cover may also be applied and removed in a very convenient manner, and may be folded into a compact unit for storage or handling when not in use.

Further features and advantages of the invention will be apparent from the description below.

BRIEF DESCRIPTION OF THE DRAWINGS

The invention is herein described, by way of example only, with reference to the accompanying drawings wherein.

DESCRIPTION OF A PREFERRED EMBODIMENT

Figure 1:
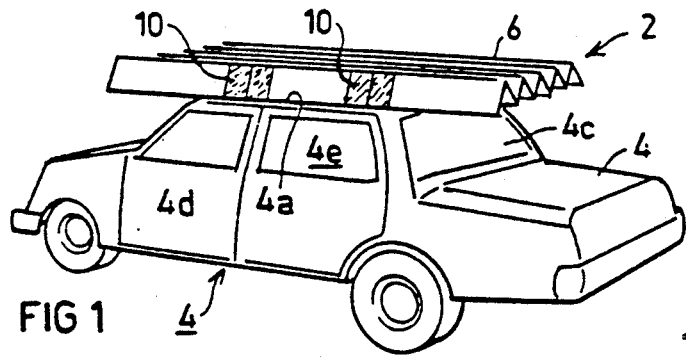
FIGS. 1 and 2 are three-dimensional views illustrating one form of cover constructed in accordance with the present invention applied to a motor vehicle.

The cover illustrated in the drawings is in the form of a panel, generally designated 2, of stiff sheet material having a length and width sufficient at least to cover the roof 4a of the vehicle 4. In the illustrated embodiment, panel 2 is of a length substantially greater than that of the vehicle roof 4a, so as to extend both forwardly past the vehicle windshield 4b and rearwardly past the vehicle rear window 4c, and thereby also at least to partially shield both the windshield and rear window from the sun when the panel is applied to the vehicle roof.

Figure 5:
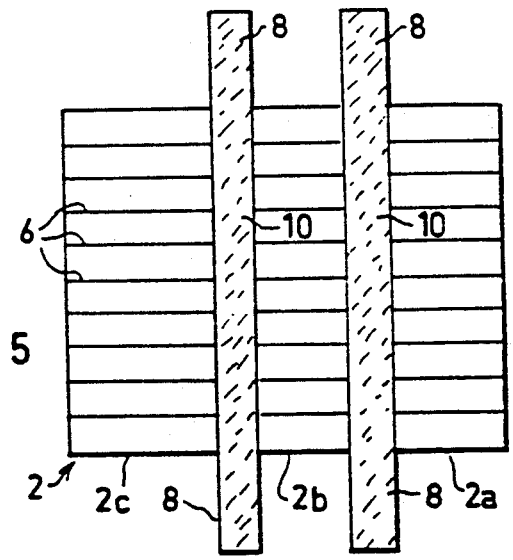
FIG. 5 illustrates the cover of FIGS. 1 and 2 in its flattened form.

Panel 2, in its flattened condition, (FIG. 5) is also of a width substantially larger than the width of the vehicle roof 4a. The panel, however, is formed with a plurality of longitudinal fold lines, as shown at 6, to permit folding it in accordian fashion, and thereby to permit adjusting its width to the width of the vehicle roof 4a.

Figure 2:
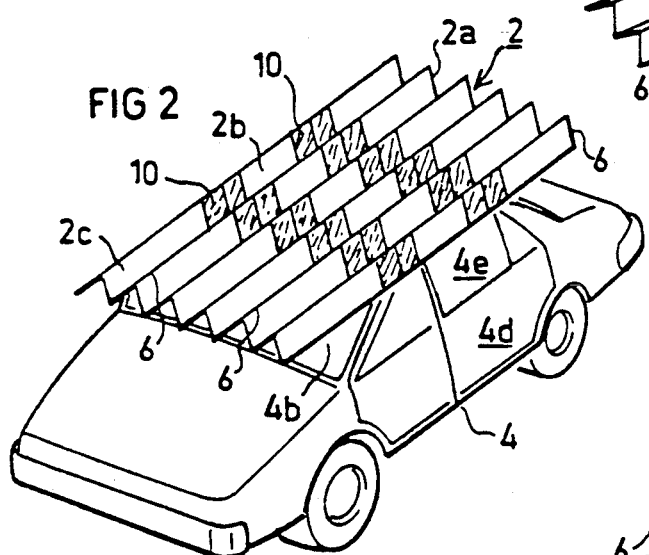

The cover illustrated in the drawings further includes a plurality of anchoring members 8 extending from opposite sides of the panel for anchoring it to the vehicle roof 4a when applied thereto. The anchoring members 8 are flexible elongated elements, such as fabric or plastic strips, projecting from the opposite sides of the panel 2 and are receivable between the vehicle body 4 and the vehicle doors 4d or the vehicle windows 4e when the doors or windows are closed as shown in FIGS. 1 and 2.

Figure 6:
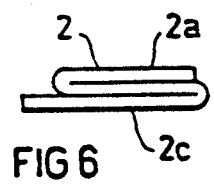
FIG. 6 illustrates the cover of FIGS. 1 and 2 in its folded form for storage and handling when not in use.
Figure 4:
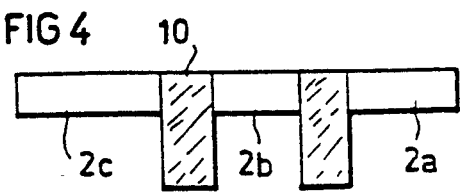

Panel 2 is folded along at least five longitudinal fold lines 6 and along at least one transverse fold line 10 in order to permit the panel to be folded into a compact unit for storage or handling when not in use (FIG 6). In the described preferred embodiment, the panel includes eleven longitudinal fold lines 6 and two transverse fold lines 10, thereby enabling the panel to be expanded in width to that of the vehicle roof 4a, and also to be folded into a compact form, as shown in FIG. 6, for storage and handling when not in use.

Figure 3:
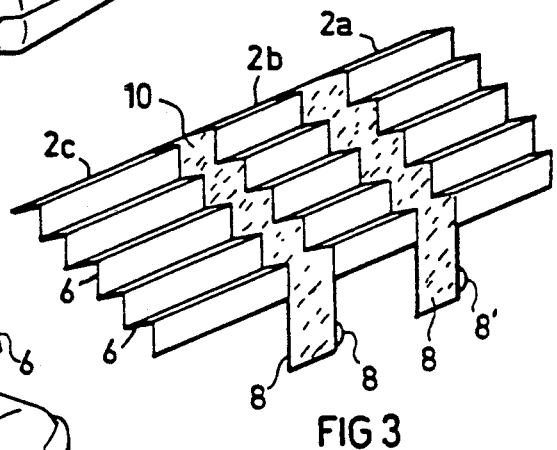
FIGS. 3 and 4 are three-dimensional and side-elevational views respectively illustrating the cover of FIGS. 1 and 2 in its operative form as applied to the vehicle.

To permit panel 2 to be folded along the transverse fold lines 10, the panel is made of three panel secitons 2a, 2b, 2c, each being of a sheet of the stiff material formed with the longitudinal fold lines 6, which sections are joined together by two transversely-extending flexible strips defining the two transverse fold lines 10. The anchoring members 8, receivable between the vehicle body and the vehicle doors or windows as described above, may be extensions of the flexible strips 10. In such case, the outer extremities of the flexible strips are preferably thickened, as shown at 8$^1$ in FIG. 3, to more securely anchor the panel 2 between the vehicle body and the vehicle doors or windows when the panel is applied over the vehicle roof and the vehicle doors or windows are closed.

The manner of using the cover illustrated in the drawings will be apparent from the above description.

Thus, the cover, when not in use, may be conveniently carried in its compact folded condition as illustrated in FIGS. 6. Whenever it is to be used, it is applied in its folded condition to the roof 4a of the vehicle, and then opened along the transverse flexible strips 10, defining the transverse fold lines, so that the three sections 2a-2c overlie the top of the roof and partially project forwardly of the front windshield 4b and rearwardly of the rear window 4c as shown in FIGS. 1 and 2. The panel 2 may then be opened along its longitudinal fold lines 6 to adjust its width to that of the vehicle roof.

The extensions 8 of the flexible transverse strips 10 may be passed between the vehicle body and the doors 4d or windows 4e on the opposite sides of the vehicle, which doors or windows would then be closed to firmly anchor the panel to the roof of the vehicle. As indicated earlier, the outer extremities of the anchor members 8 are preferably thickened, as shown at 8$^1$ in FIG. 3, so as to securely anchor the panel between the vehicle body and the vehicle doors or windows when closed.

It will thus be seen that the cover may be carried in a compact manner when not in use, may be conveniently applied to the vehicle when to be used, and may be just as conveniently removed from the vehicle after use. It will also be seen that the cover may be produced in volume and at low cost.

While the drawings illustrate one preferred embodiment of the invention, it will be appreciated that many variations may be made. For example, the panel 2 may be of a length substantially equal to that the vehicle roof. It could include less than or more than the three illustrated sections. Also, it could include extensions, either of stiff material or of pliable material, at the front end/or rear, to cover the front windshield 4b and/or the reared window 4c, either by loosely resting such extensions against those windows, or by securing them, e.g., via suction cups. Similar extensions may be provided at the sides of the panel 6 to cover the side windows 4e of the vehicle. In addition, instead of using extensions of the transverse flexible strips 10 as the anchoring members, separate anchoring members, e.g. cords, could be used, and such anchoring members could be attached to the vehicle by hooks or other means. Further, the cover could be constructed so that, in its folded condition, it can also serve the same function as a triangular reflector placed next to a disabled vehicle. It could also include some sort of supporting structure, for example pivotal posts, which may be pivotted to a retracted position when the cover is used for covering a vehicle, and pivotted to an extended position when not so used in order to permit the cover also to be used as a roof or sunscreen.

Further variation, modifications and applications of the invention will be apparent.

What is claimed is:

1. A cover for a motor vehicle, comprising:

a panel of stiff sheet material having a width sufficient at least to cover the vehicle roof;

said panel being formed with a plurality of longitudinal fold lines to extend longitudinally of the vehicle and to permit folding the panel in accordian fashion and thereby to adjust its width to the width of the vehicle roof to which it is applied;

said panel being of a length greater than that of the vehicle roof so as to extend forwardly of the vehicle windshield and rearwardly of the vehicle rear window and thereby to at least partially shield the windshield and rear window from the sun when the panel is applied to the vehicle roof;

said panel including at least two sections, each constituted of a sheet of stiff material formed with said longitudinal fold lines and joined together by a transversely-extending flexible strip defining said transverse fold line;

and a plurality of anchoring members extending from opposite sides of the panel for anchoring it to the vehicle roof when applied thereover;

said anchoring members being constituted of said transversely-extending flexible strips.

2. The cover according to claim 1, wherein said panel is also formed with at least one transverse fold line to permit it to be folded into a compact unit for storage or handling when not in use.

3. The cover according to claim 2, wherein said panel is foldable along at least five longitudinal fold lines and one transverse fold line.

4. The cover according to claim 1, wherein said panel includes three sections, each constituted of a sheet of stiff material formed with said longitudinal fold lines and joined together by two transversely extending flexible strips defining two transverse fold lines.

5. The cover according to claim 1, wherein the outer ends of said transversely extending flexible strip or strips are thickened to more securely anchor the panel between the vehicle body and the vehicle doors or windows when the panel is applied over the vehicle roof and the doors or windows are closed.

6. A cover for a motor vehicle having doors and windows, comprising:

a panel of stiff sheet material having a width sufficient at least to cover the vehicle roof;

said panel being formed with at least five longitudinal fold lines to extend longitudinally of the vehicle to permit folding the panel in accordian fashion and thereby to adjust its width to the width of the vehicle roof to which it is applied;

said panel being of a length greater than that of the vehicle roof so as to extend forwardly of the vehicle windshield and rearwardly of the vehicle rear window and thereby to at least partially shield the windshield and rear window from the sun when the panel is applied to the vehicle roof;

said panel including at least three sections, each constituted of a sheet of stiff material formed with said longitudinal fold lines and joined together by a transversely-extending flexible strip defining said transverse fold line;

and a plurality of flexible elongated elements projecting from the opposite sides of the panel and receivable between the vehicle body and the vehicle doors or windows for anchoring the panel to the vehicle roof when such doors or windows are closed;

said anchoring members being constituted of said transversely-extending flexible strips.

7. The cover according to claim 6, wherein the outer ends of said transversely extending flexible strip or strips are thickened to more securely anchor the panel between the vehicle body and the vehicle doors or windows when the panel is applied over the vehicle roof and the doors or windows are closed.

* * * * *